United States Patent [19]
Schneider, Sr.

[11] 3,878,696
[45] Apr. 22, 1975

[54] SHOCK LOAD RELEASE CLUTCH

[76] Inventor: Michael Schneider, Sr., 1120 S. Union St., Alliance, Ohio 44601

[22] Filed: Oct. 15, 1973

[21] Appl. No.: 406,693

[52] U.S. Cl. ................................................. 64/29
[51] Int. Cl. ............................................ F16d 7/04
[58] Field of Search ........ 64/29; 192/56 R, 71, 150

[56] References Cited
UNITED STATES PATENTS

| 716,857 | 12/1902 | Boivin | 64/29 X |
|---|---|---|---|
| 1,745,738 | 2/1930 | Carter, Jr. | 64/29 |
| 2,017,591 | 10/1935 | Dumm | 64/29 |
| 2,028,441 | 1/1936 | Decker | 64/29 X |
| 2,656,185 | 10/1953 | Bach | 64/29 X |
| 2,753,029 | 7/1956 | Babaian | 64/29 X |
| 3,643,770 | 2/1972 | Faulds | 192/71 X |

*Primary Examiner*—Allan D. Herrmann
*Attorney, Agent, or Firm*—Webster B. Harpman

[57] ABSTRACT

A clutch for transmitting motion between a drive and a driven shaft provides automatic shock load release and incorporates a torque adjustment controlling said release. Flat C-shaped tensioning members engaged on rotatable discs control the portions of the clutch normally interconnecting the drive and driven parts thereof.

6 Claims, 3 Drawing Figures

SHOCK LOAD RELEASE CLUTCH

BACKGROUND OF THE INVENTION

1. Field of the Invention

This invention relates to clutches of the release type actuated by a shock load and wherein the torque required to effect such release is adjustable.

2. Description of the Prior Art

Prior structures of this type may be seen in U.S. Pat. Nos. 716,857, 2,431,107, 2,706,546, 2,829,749, 3,103,999 and 3,643,770.

This invention introduces a more positive tensioning means for controlling the torque level at which the device operates and provides a positive means of adjusting the tension applied by the tensioning device. Additionally the tensioning means in the present invention is provided in duplicate assemblies each of which engages an independently movable pawl which forms the mechanical connection between the drive and driven members of the device.

SUMMARY OF THE INVENTION

A shock load release clutch consists of drive and driven shafts and a mechanism interconnecting the same incorporating torque actuated means which is adjustable and is tensioned by novel C-shaped tensioning members.

DESCRIPTION OF THE PREFERRED EMBODIMENT

Figure 1:
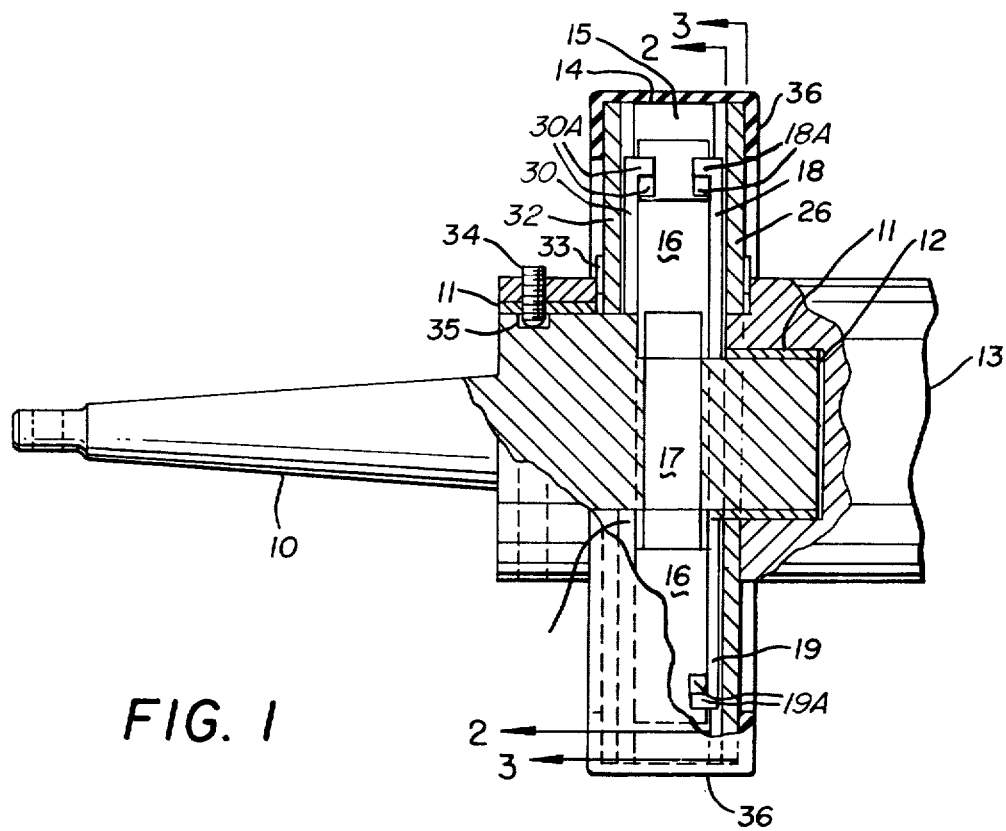
FIG. 1 is a side elevation of the shock load release clutch with parts broken away and parts in cross section.

In the form of the invention chosen for illustration and description herein a drive shaft 10 is journeled on bearings 11 in a cylindrical cavity 12 in a driven member 13. The driven member 13 has an annular flange 14 thereabout with oppositely disposed drilled openings 15 therein in which an oppositely disposed pair of pawls 16 are positioned for radial movement. The inner oppositely disposed ends of the pawls 16 are oppositely tapered and are normally positioned so as to extend into the cylindrical cavity 12 in the driven member 13 so as to engage the opposite sides of the opposite ends of a pin 17 positioned transversely of the drive shaft 10 with its ends extending outwardly therefrom and in the area of the cylindrical chamber 12 of the driven member 13.

In order that rotary motion imparted the drive shaft 10 can be transmitted to the driven member 13 through the shock load release clutch, tensioning means are provided to hold the pawls 16 in engagement against the opposite ends of the pin 17. The tensioning means comprise pairs of transversely flat, C-shaped springs 18 and 19 respectively as best seen in FIG. 2 of the drawings. As seen therein and in FIG. 1 of the drawings the opposite ends of each of the pairs of C-shaped springs 18 and 19 are turned in opposite directions. The upper ends 18A of the pair of C-shaped springs 18 are turned inwardly so as to register in a slot 20 in the flange 14 which slot 20 communicates with the drilled opening 15 therein. The pawls 16 are also slotted as at 21 and the inturned ends 18A of the pair of C-shaped springs 18 extend through the slot 20 and into the slot 21 in the pawl 16 and engage the same so as to urge the same inwardly of the device, downwardly as seen in FIGS. 1 and 2 of the drawings.

Still referring to these Figures of the drawing it will be seen that the lower ends of the second pair of transversely flat C-shaped springs 19 have inturned ends 19A registering in a slot 22 which communicates with the other one of the drilled openings 15 in the flange 14 of the device. The inturned ends 19A of the C-shaped springs 19 extend through the slot 22 and into the matching slot 21 in the opposite pawl 16 and engage the same so as to urge it inwardly of the device, upwardly as seen in FIGS. 1 and 2 of the drawings. The inner one of each of the opposite ends of both pairs of C-shaped tensioning springs 18 and 19 is outturned as indicated by the numerals 23 and 24 respectively in FIG. 2 of the drawings and these outturned ends 23 and 24 respectively are engaged in openings 25 in an adjustment disc 26 which is seen in FIGS. 1 and 3 of the drawings.

Figure 2:
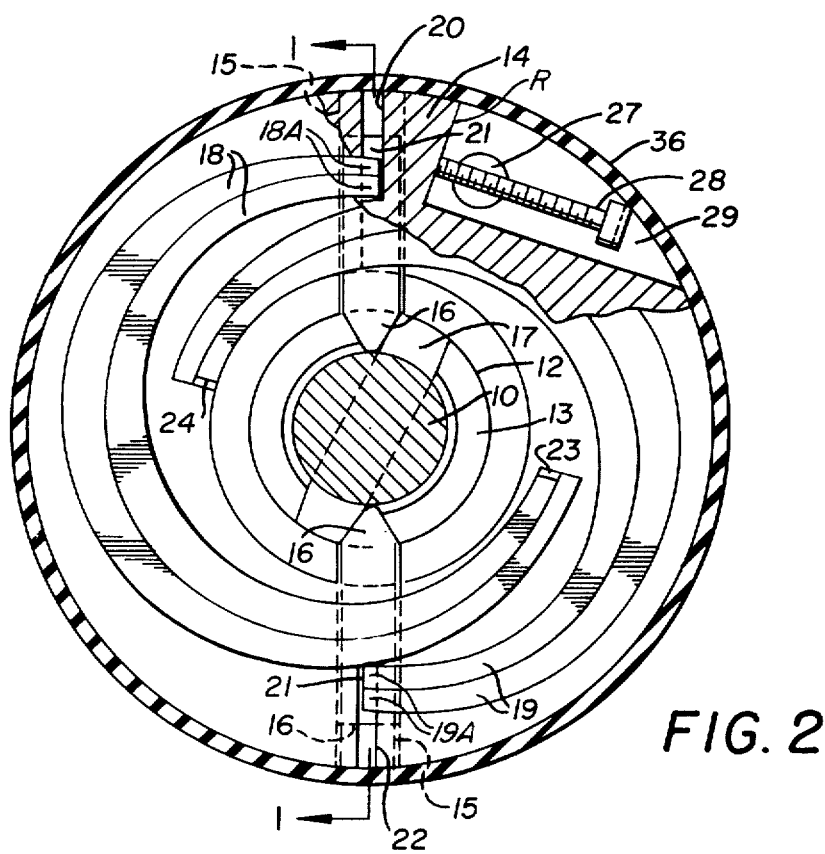
FIG. 2 is a vertical section on line 2—2 of FIG. 1.
Figure 3:
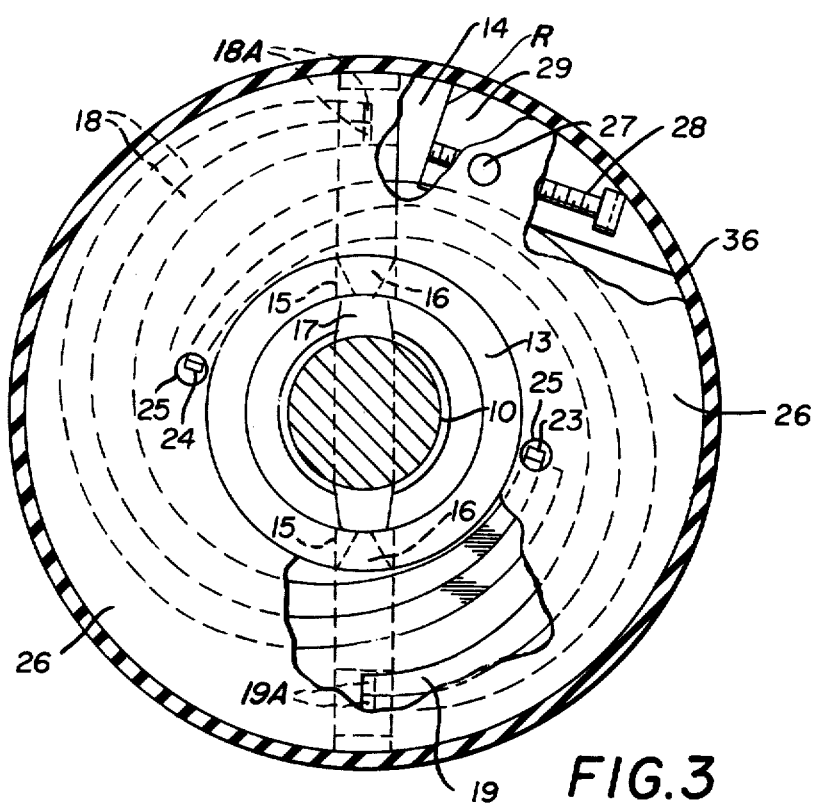
FIG. 3 is a vertical section on line 3—3 of FIG. 1 showing the clutch in release position.

In FIG. 3 of the drawings the adjustment disc 26 will be seen to be positioned adjacent the pairs of C-shaped springs 18 and 19 in covering relation thereto with the adjustment disc 26 being rotatably positioned on a shoulder of the driven member 13 as best seen in FIG. 1 of the drawings. In order that the adjustment disc 26 may be partially rotated relative to the driven member 13 so as to change the positioning of the ends 23 and 24 of the C-shaped springs 18 and 19 and thereby change the tension exerted by their other ends on the pawls 16 a pivot link 27 is engaged in an opening in the adjustment disc 26, a screw 28 is positioned through the pivot link 27 and disposed in a notch 29 in the periphery of the flange 14 on the driven member 13.

By referring again to FIG. 1 of the drawings it will be seen that the adjustment disc 26 and the two pairs of tensioning springs 18 and 19 are located on the right side of the flange 14 of the driven member 13 of the device and that a duplicate assembly of tensioning springs 30 and 31 and a secondary adjustment disc 32 are located on the left side of the annular flange 14 so that each of the pawls 16 is engaged on its outermost ends by the inturned ends 30A and 31A of two pairs of tensioning springs 30 and 31.

In FIGS. 2 and 3 of the drawings, the pivot link 27 and the screw 28 positioned therethrough and engaged against a radial wall of the notch 29 and the flange 14 will be seen to be engaged in the adjustment disc 26 on the one side of the flange 14 and in the secondary adjustment disc 32 on the other side of the flange 14 so that motion imparted the screw 28 will cause the pivot link 27 thereon to move relative thereto and thereby move the adjustment discs 26 and 32 simultaneously and in the same degree. Thus both the adjustment discs will move responsive to a single adjusting motion of the screw 28 and both the adjustment discs will impart the same degree of tension to the opposite ends of the pairs of C-shaped springs 18, 19 30 and 31 on the opposite sides of the annular flange 14 of the device.

In FIG. 3 of the drawings, portions of the adjustment disc 26 have been broken away and the exposed portions of the first pair of tensioning springs 18 and 19 are illustrated in solid lines with broken lines illustrating their positions beneath the adjustment disc 26 and adjacent the flange 14 in the two positions they occupy when the pawls 16 move outwardly radially of the device as in response to a shock load condition sufficient to overcome the adjusted tension of the tensioning springs.

The adjustment discs 26 and 32 are held in position against the outer flat surfaces of the four pairs of tensioning springs 18 and 19 and 30 and 31 by snap ring fasteners 33 as will be understood by those skilled in the art and the driven member 13 is provided with an inwardly extending set screw 34 which engages a channel 35 in the drive shaft 10 so as to hold the drive shaft 10 and the driven member 13 against axial displacement.

An annular flanged resilient closure 36 is positioned around the periphery of the annular flange 14 of the driven member 13 so as to close the outer ends of the drilled openings 15 therein in which the radially movable pawls 16 are located as hereinbefore described.

It will thus be seen that a shock load release clutch has been disclosed which may be tensioned with respect to the torque required to release the same by a single adjustment of the screw 28 causing partial rotary action of the adjustment discs 26 and 32 to tension the four pairs of C-shaped tensioning springs, 18, 19 and 30 and 31 respectively whereby a positively controlled tensioning of the release members of the device may be obtained.

When a desired tension is established rotary motion imparted the drive shaft 10 will be imparted the driven member 13 until such time as resistance to the rotary motion of the driven member 13 causes the pawls 16 to retract radially, outwardly of the flange 14 of the device against the restraining action of the tensioning springs whereupon the transverse pin 17 in the drive shaft 10 will revolve relative to the driven member 13 and any driven device such as sewer cleaning tools for example, in connection with the driven member 13 will not be damaged or destroyed as might otherwise be the case.

It will further be seen that the device is relatively simple in arrangement and construction and capable of quick and easy adjustment.

Although but one embodiment of the present invention has been illustrated and described it will be apparent to those skilled in the art that various changes and modifications may be made therein without departing from the spirit of the invention.

Having thus described my invention, what I claim is:

1. A shock load release clutch comprising a driving member and a driven member in telescopic relation, circumferentially spaced means on said driving member extending outwardly therefrom, pawls movable in radial openings in said driven member for engagement with and normally engaging said means, C-shaped springs having right angularly disposed end portions, positioned about said driven member, an adjustment disc rotatably mounted on said driven member, at least one of said right angular end portions of said springs engaged in each of said openings, and on said pawls and at least one of the other of said right angular end portions of said springs engaged in an opening in said adjustment disc and means for adjustably positioning and retaining said adjustment disc relative to said driving member.

2. The shock load release clutch of claim 1 and wherein an annular flange is formed on said driven member and said openings are located therein.

3. The shock load release clutch of claim 1 and wherein an annular flange is formed on said driven member and said openings are located therein and said C-shaped springs are located against at least one side of said flange and said adjustment disc is positioned against said springs.

4. The shock load release clutch of claim 1 and wherein said means for adjustably positioning said adjustment disc consists of a pivot link on said disc, a screw engaged in said link and engaged in a notch in said driven member.

5. The shock lead release clutch of claim 1 and wherein said driven member has a cylindrical chamber therein about said driving member and said pawls are movable into said chamber so as to engage the means on said driving member in one position and into said openings in a second position so as to disengage said means.

6. The shock load release clutch of claim 1 and wherein said driven member has an annular flange thereabout, said openings extending radially in said flange, slots in the sides of said flange communicating with said openings, duplicate pairs of said C-shaped springs located one pair on each side of said flange, said adjustment disc positioned adjacent one of said duplicate pairs of springs and a secondary adjustment disc positioned adjacent the other one of said duplicate pairs of springs, and said means for adjustably positioning and retaining said adjustment discs relative to said driven member consists of a pivot link engaging secondary openings in said adjustment discs and a screw in said link engaged on said driven means so as to move said discs when rotated.

* * * * *